US011174788B1

(12) United States Patent
Kittleson et al.

(10) Patent No.: US 11,174,788 B1
(45) Date of Patent: Nov. 16, 2021

(54) SYSTEMS AND METHODS FOR COOLING AN ENDWALL IN A ROTARY MACHINE

(71) Applicant: General Electric Company, Schenectady, NY (US)

(72) Inventors: Jacob Kittleson, Greenville, SC (US); Daniel R. Burnos, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/875,604

(22) Filed: May 15, 2020

(51) Int. Cl.
*F02C 7/12* (2006.01)

(52) U.S. Cl.
CPC ............ *F02C 7/12* (2013.01); *F05D 2220/32* (2013.01); *F05D 2260/201* (2013.01)

(58) Field of Classification Search
CPC ... F02C 7/12; F05D 2220/32; F05D 2260/201
See application file for complete search history.

(56) References Cited

U.S. PATENT DOCUMENTS

| | | | |
|---|---|---|---|
| 5,545,002 A * | 8/1996 | Bourguignon | .......... F01D 5/187 415/115 |
| 6,254,333 B1 * | 7/2001 | Merry | .................. F01D 11/005 415/115 |
| 6,598,398 B2 | 7/2003 | Viteri et al. | |
| 6,905,302 B2 * | 6/2005 | Lee | .......... F01D 25/12 415/115 |
| 8,011,881 B1 * | 9/2011 | Liang | ...................... F01D 5/187 415/115 |
| 8,794,921 B2 * | 8/2014 | Ellis | ........................ F01D 5/187 416/97 R |
| 8,814,518 B2 * | 8/2014 | Harris, Jr. | ............... F01D 5/081 416/97 R |
| 8,905,714 B2 * | 12/2014 | Ellis | ........................ F01D 5/187 416/97 R |
| 9,021,816 B2 * | 5/2015 | Bergman | ................ F01D 5/187 60/806 |
| 9,109,454 B2 * | 8/2015 | Ellis | ........................ F01D 5/187 |
| 9,222,364 B2 * | 12/2015 | Papple | .................... F01D 5/187 |
| 9,416,665 B2 * | 8/2016 | Xu | .......................... F01D 9/065 |
| 9,518,468 B2 * | 12/2016 | Tibbott | .................... F01D 9/06 |
| 9,856,747 B2 * | 1/2018 | Davis | ...................... F01D 9/041 |
| 10,323,520 B2 * | 6/2019 | Perry, II | .................. F01D 25/12 |

(Continued)

FOREIGN PATENT DOCUMENTS

| | | |
|---|---|---|
| CN | 101307915 A | 11/2008 |
| CN | 101435585 A | 5/2009 |
| JP | 2009128509 A | 6/2009 |

*Primary Examiner* — Jesse S Bogue
(74) *Attorney, Agent, or Firm* — Armstrong Teasdale LLP

(57) ABSTRACT

A core for use in cooling a component used in a rotary machine is provided. The core includes a passage including a divider separating a first inlet portion and a second inlet portion to define a split pass inlet, which is fluidly coupled to at least one first pass, at least one second pass, and at least one turn. The at least one first pass channels a flow of cooling fluid in a first direction from the split pass inlet. The at least one second pass channels the flow of cooling fluid in a second direction opposite the first direction. The at least one turn changes a direction of flow of the cooling fluid from the first direction to the second direction. The at least one first pass, the at least one second pass, and the at least one turn are arranged, such that the passage defines a serpentine passage.

18 Claims, 6 Drawing Sheets

(56) References Cited

U.S. PATENT DOCUMENTS

| | | | |
|---|---|---|---|
| 2012/0034102 A1* | 2/2012 | Boyer | F01D 5/187 416/97 R |
| 2013/0230394 A1* | 9/2013 | Ellis | F01D 5/187 416/1 |
| 2014/0072400 A1* | 3/2014 | Dillard | F01D 5/187 415/1 |
| 2018/0355726 A1* | 12/2018 | Perry, II | F01D 5/085 |

* cited by examiner

SYSTEMS AND METHODS FOR COOLING AN ENDWALL IN A ROTARY MACHINE

BACKGROUND

The field of the disclosure relates generally to cooling systems and, more specifically, to impingement cooling of rotary machine components.

In at least some known rotary machines, energy extracted from a gas stream in a turbine is used to power a mechanical load. During operation of the rotary machine, various hot gas path components may be subjected to a high-temperature gas stream. Over time, continued exposure to high temperatures may induce wear in the hot gas path components. For example, in some known turbines, air is pressurized in a compressor and mixed with fuel in a combustor to generate high-temperature gases. Generally, higher temperature gases increase performance, efficiency, and power output of the rotary machine. To facilitate reducing the effects of the high temperatures, at least some known hot gas path components are cooled. However, higher temperature gases can also increase thermal stresses and/or thermal degradation of the rotary machine components.

Some known hot gas path components are formed with an endwall that includes an internal cooling system, wherein a cooling fluid, such as bleed air extracted from a compressor or steam, is forced through cores defined within the endwall. At least some known cores are formed with an inlet opening that channels the cooling fluid into the core and directs the cooling fluid to impinge on internal surfaces of the core, thus increasing cooling of the endwall. However, at least some known cores include a pin bank that channels the cooling fluid directly to at least one exit opening from the inlet opening rather than channeling the cooling fluid in a circuit through the endwall. As such, the cores are not as efficiently cooled as cores that include serpentine or circuitous passages. Moreover, at least some known cores have serpentine or circuitous passages that channel the cooling fluid through the endwall from a single inlet. However, modulating the pressure drop within the passages can be difficult in known cores.

BRIEF DESCRIPTION

In one aspect, a core for use in cooling a component used in a rotary machine is provided. The core includes a passage including a first inlet portion, a second inlet portion, a divider, at least one first pass, at least one second pass, and at least one turn. The divider separates the first inlet portion from the second inlet portion such that the first inlet portion, the second inlet portion, and the divider define a split pass inlet. The at least one first pass channels a flow of cooling fluid in a first direction from the split pass inlet. The at least one second pass channels the flow of cooling fluid in a second direction opposite the first direction. The at least one turn changes a direction of flow of the cooling fluid from the first direction to the second direction. The at least one first pass, the at least one second pass, and the at least one turn are arranged such that the passage defines a serpentine passage.

In another aspect, a gas turbine system is provided. The gas turbine system includes a turbine section including an inner endwall, an outer endwall, a plurality of airfoils, and a core. The turbine section is coupled in flow communication with a combustion system. The inner endwall circumscribes the longitudinal axis of the gas turbine system. The outer endwall circumscribes a longitudinal axis of the gas turbine system and the inner endwall. The plurality of airfoils each extend between the outer endwall and the inner endwall. The core is positioned within at least one of the outer endwall and the inner endwall for cooling at least one of the outer endwall and the inner endwall. The core includes a passage including a first inlet portion, a second inlet portion, a divider, at least one first pass, at least one second pass, and at least one turn. The divider separates the first inlet portion from the second inlet portion such that the first inlet portion, the second inlet portion, and the divider define a split pass inlet. The at least one first pass channels a flow of cooling fluid in a first direction from the split pass inlet. The at least one second pass channels the flow of cooling fluid in a second direction opposite the first direction. The at least one turn changes a direction of flow of the cooling fluid from the first direction to the second direction. The at least one first pass, the at least one second pass, and the at least one turn are arranged such that the passage defines a serpentine passage.

In another aspect, a method of cooling a component of a rotary machine is provided. The method includes inserting a core into a plenum within the component. The core includes a passage including an inlet portion, at least one first pass, at least one second pass, at least one turn. The inlet portion includes a first inlet portion, a second inlet portion, and a divider. The divider separates the first inlet portion from the second inlet portion such that the inlet portion is a split pass inlet. The method also includes channeling a flow of cooling fluid into the first inlet portion and the second inlet portion. The method further includes channeling the flow of cooling fluid from the first inlet portion and the second inlet portion into the at least one first pass. The flow of cooling fluid from the first inlet portion merges with the flow of cooling fluid from the second inlet portion, and the at least one first pass channels the flow of cooling fluid in a first direction. The method also includes channeling the flow of cooling fluid from the at least one first pass into the at least one turn. The at least one turn changes a direction of flow of the cooling fluid from the first direction to a second direction opposite the first direction. The method further includes channeling the flow of cooling fluid from the at least one turn into the at least one second pass. The at least one first pass, the at least one second pass, and the at least one turn are arranged such that the passage defines a serpentine passage.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
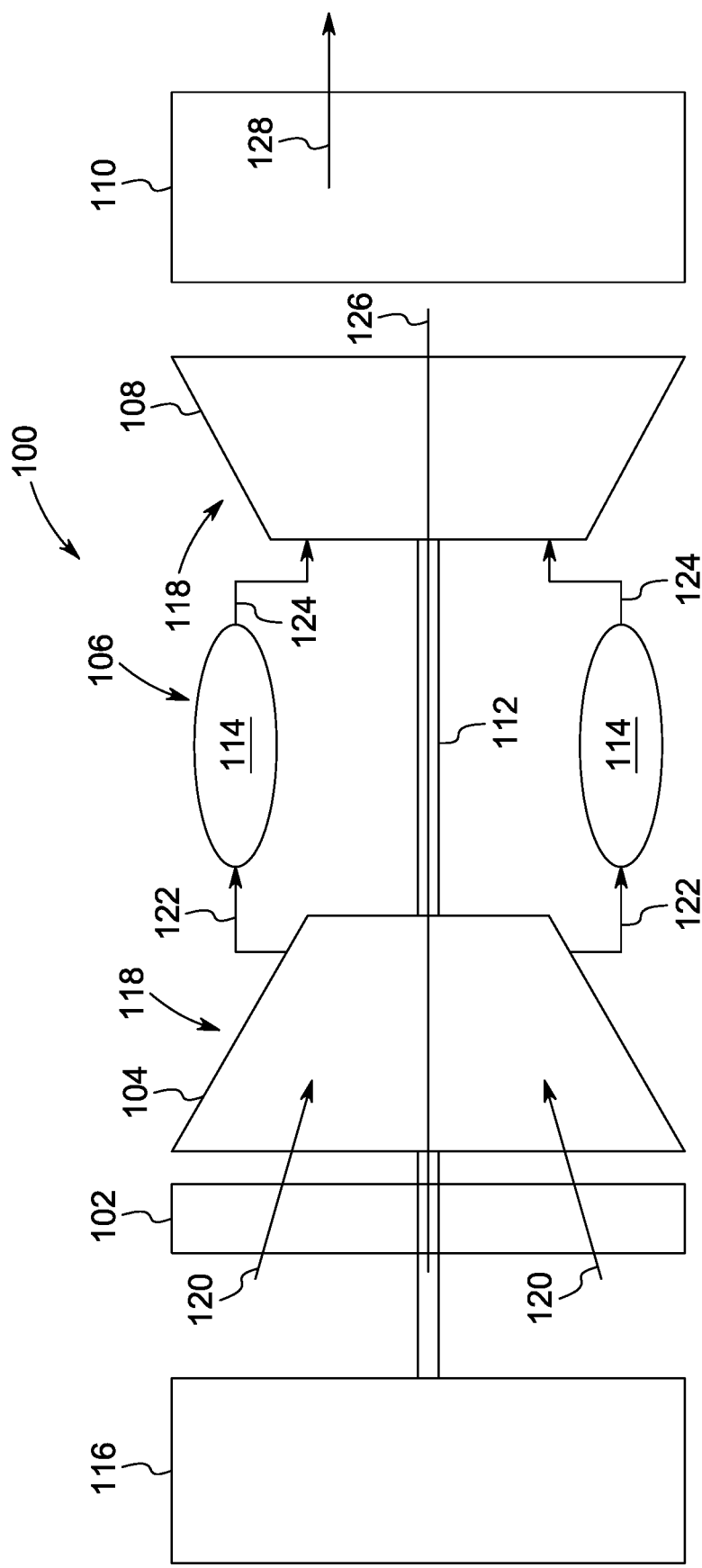
FIG. 1 is a schematic view of an exemplary rotary machine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, the terms "axial" and "axially" refer to directions and orientations extending substantially parallel to a longitudinal axis of a rotary machine. Moreover, the terms "radial" and "radially" refer to directions and orientations extending substantially perpendicular to the longitudinal axis of the rotary machine. In addition, as used herein, the terms "circumferential" and "circumferentially" refer to directions and orientations extending arcuately about the longitudinal axis of the rotary machine. Further, as used herein, the term "upstream" refers to a forward or inlet end of a rotary machine, and the term "downstream" refers to an aft or exhaust end of the rotary machine. When discussing a flow of fluid through a component, the direction from which the fluid flows is described as "upstream," and the direction in which the fluid flows is described as "downstream."

The systems described herein relate to a serpentine core for use in cooling portions of a hot gas path in a rotary machine. Specifically, in the exemplary embodiment, a rotary component includes an outer endwall formed in a nozzle of a turbine section within the rotary machine. The outer endwall includes a core for use in cooling the outer endwall. The core includes a serpentine passage including an inlet portion, a first pass, a second pass, and a turn. The inlet portion includes a divider, a first inlet portion, and a second inlet portion. The divider separates the first inlet portion from the second inlet portion, such that a split pass inlet is defined. The first pass, the second pass, and the turn include a plurality of outlets that channel cooling fluid from the core into the hot gas path to form a cooling film on the outer endwall. A plurality of core ties channels cooling fluid from an upstream portion of the core to a downstream portion of the core to enable the downstream portions to be replenished with lower temperature cooling fluid.

In the exemplary embodiment, cooling fluid is channeled through the first pass, the second pass, and the turn to facilitate cooling the outer endwall from within the core. The serpentine configuration of the first pass, the second pass, and the turn enables the cooling fluid to cool a larger area of the outer endwall, thus increasing the overall heat transfer between the cooling fluid and the outer endwall. Additionally, the serpentine configuration enables the cooling fluid to circulate with a lower pressure that is substantially equal to the pressure of combustion gases at a throat of the nozzle. Furthermore, a width of each of the first pass, the second pass, and the turn is selected to facilitate modification of, or tune, the pressure drop of the cooling fluid through the first pass, the second pass, and the turn and to increase the overall heat transfer between the cooling fluid and the outer endwall. Moreover, the outlets channel cooling fluid into the hot gas path to facilitate forming a cooling film across the stator endwall. Additionally, the core ties replenish downstream portions of the core with cooling fluid, as well as provide inspection access, rigidity during core formation, and leachability for ceramic core removal after the casing process.

FIG. 1 is a schematic view of an exemplary rotary machine 100, i.e., a turbomachine, and more specifically a turbine engine. In the exemplary embodiment, rotary machine 100 is a gas turbine engine. Alternatively, rotary machine may be any other turbine engine and/or rotary machine, including, without limitation, a steam turbine engine, a gas turbofan aircraft engine, other aircraft engine, a wind turbine, a compressor, and a pump. In the exemplary embodiment, gas turbine engine 100 includes an intake section 102, a compressor section 104 that is coupled downstream from intake section 102, a combustor section 106 that is coupled downstream from compressor section 104, a turbine section 108 that is coupled downstream from combustor section 106, and an exhaust section 110 that is coupled downstream from turbine section 108. Turbine section 108 is coupled to compressor section 104 via a rotor shaft 112.

It should be noted that, as used herein, the term "couple" is not limited to a direct mechanical, thermal, electrical, and/or flow communication connection between components, but may also include an indirect mechanical, thermal, electrical, and/or flow communication connection between multiple components. In the exemplary embodiment, combustor section 106 includes a plurality of combustors 114. Combustor section 106 is coupled to compressor section 104 such that each combustor 114 is in flow communication with the compressor section 104. Rotor shaft 112 is further coupled to a load 116 such as, but not limited to, an electrical generator and/or a mechanical drive application. In the exemplary embodiment, each of compressor section 104 and turbine section 108 includes at least one rotor assembly 118 that is coupled to rotor shaft 112.

During operation, intake section 102 channels air 120 towards compressor section 104. Compressor section 104 compresses inlet air 120 to higher pressures prior to discharging compressed air 122 towards combustor section 106. Compressed air 122 is channeled to combustor section 106 where it is mixed with fuel (not shown) and burned to generate high temperature combustion gases 124. Combustion gases 124 are channeled downstream towards turbine section 108 and impinge upon turbine blades (not shown), converting thermal energy to mechanical rotational energy that is used to drive rotor assembly 118 about a longitudinal axis 126. Often, combustor section 106 and turbine section 108 are referred to as a hot gas section of turbine engine 100. Exhaust gases 128 then discharge through exhaust section 110 to ambient atmosphere or to a steam turbine (not shown), if the rotary machine 100 is a gas turbine that is part of a combined cycle power plant.

Figure 2:
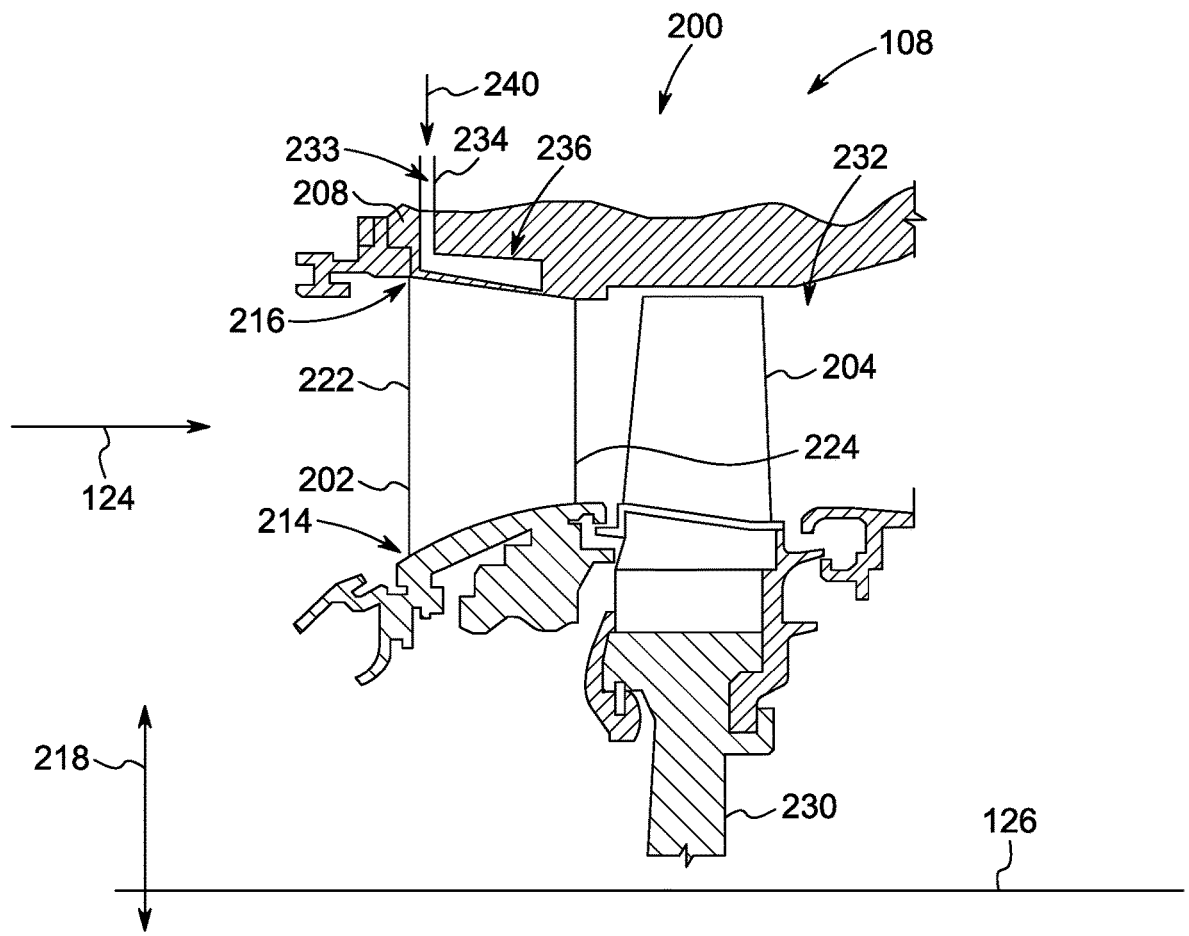
FIG. 2 is an enlarged schematic view of an exemplary turbine stage of the rotary machine shown in FIG. 1.

FIG. 2 is an enlarged schematic view of an exemplary turbine stage 200 of turbine engine 100 (shown in FIG. 1). Stage 200 includes a plurality of radially-extending stationary airfoils 202 circumferentially-spaced about longitudinal axis 126, and a plurality of radially-extending rotating airfoils 204 that are downstream from stationary airfoils 202 and circumferentially-spaced around longitudinal axis 126. The radial direction is indicated by arrow 218. Each rotating airfoil 204 is coupled to rotor shaft 112 (shown in FIG. 1) via a disk 230 and extends radially outward towards a casing 208.

Figure 3:
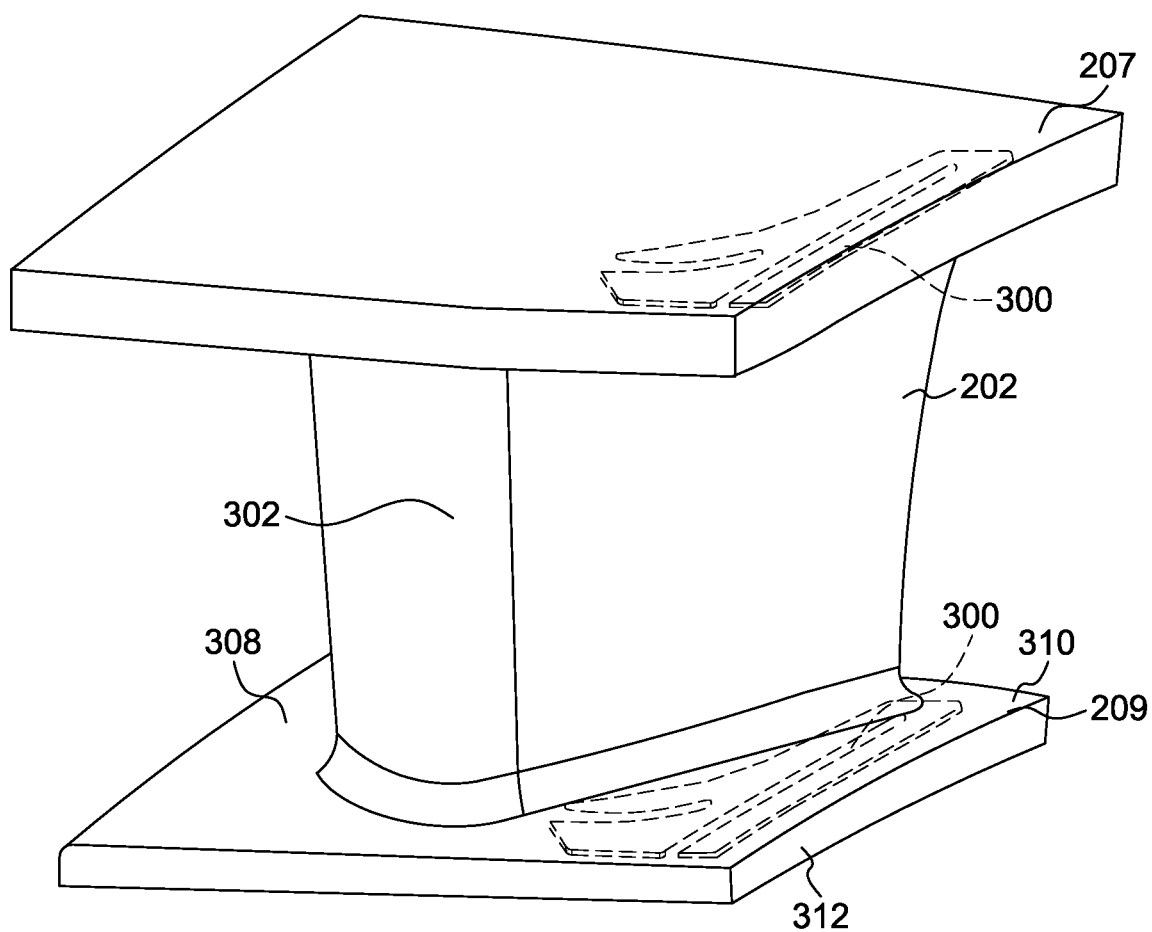
FIG. 3 is a perspective view of an exemplary stationary airfoil, outer endwall, and inner endwall that may be used with the turbine shown in FIG. 2.

In the exemplary embodiment, each stationary airfoil 202 extends from a first end 216 coupled to an outer endwall 207 of casing 208 of turbine section 108, radially inward to a second end 214 coupled to an inner endwall 209 along a radial direction 218 (the outer endwall 208 and the inner endwall 209 being shown in FIG. 3). Additionally, each stationary airfoil 202 extends axially from a leading edge 222 downstream to an opposing trailing edge 224. During operation, outer endwall 207 and inner endwall 209 define the radial boundaries of a hot gas flow path 232, such that a flow of high temperature combustion gases 124 is channeled therethrough, exposing surfaces of outer endwall 207 and inner endwall 209 to high temperatures and potential thermal stresses and/or thermal degradation. To mitigate such thermal effects, an interior cavity or plenum 236 is defined within outer endwall 207 and inner endwall 209 to facilitate internal impingement cooling of an interior surface of outer endwall 207 and inner endwall 209.

Plenum 236 is in flow communication with a coolant supply channel 233 via a plenum inlet 234 defined in outer endwall 207 and inner endwall 209. In the exemplary embodiment, coolant supply channel 233 channels a cooling fluid 240, such as a flow of pressurized bleed air from compressor section 104 (shown in FIG. 1), towards plenum inlet 234. Alternatively, cooling fluid 240 may be any suitable fluid other than air. The term "fluid," as used herein, includes any medium or material that flows, including, but not limited to, air or steam. In the exemplary embodiment, stage 200 is a first stage of turbine section 108, and stationary airfoils 202, outer endwall 207, and inner endwall 209 define a first stage turbine nozzle that is immediately downstream from combustor section 106 (shown in FIG. 1). In alternative embodiments, stage 200 is any other stage of turbine section 108. In the exemplary embodiment, plenum 236 extends axially aftward into outer endwall 207 and inner endwall 209.

Figure 4:
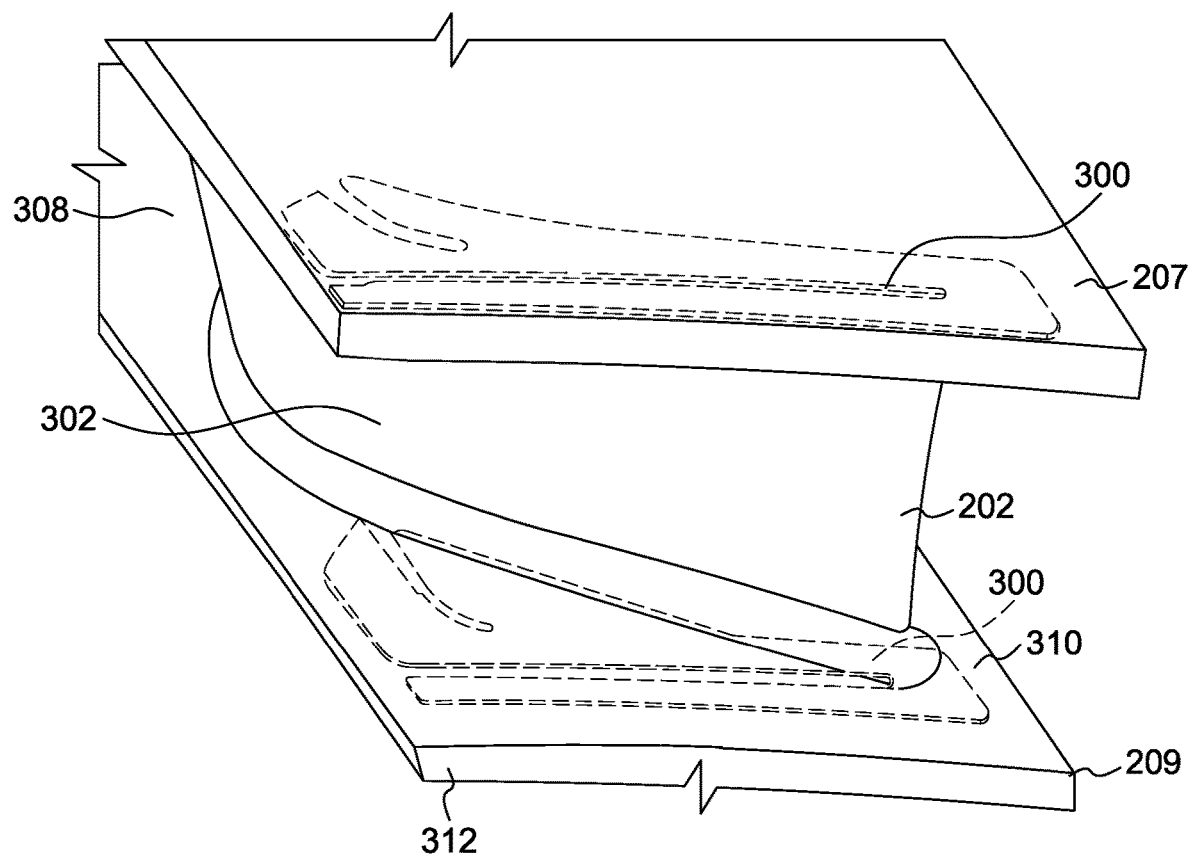
FIG. 4 is a perspective top view of the stationary airfoil, outer endwall, and inner endwall shown in FIG. 2 and exemplary cores extending through transparent outer and inner endwalls.
Figure 5:
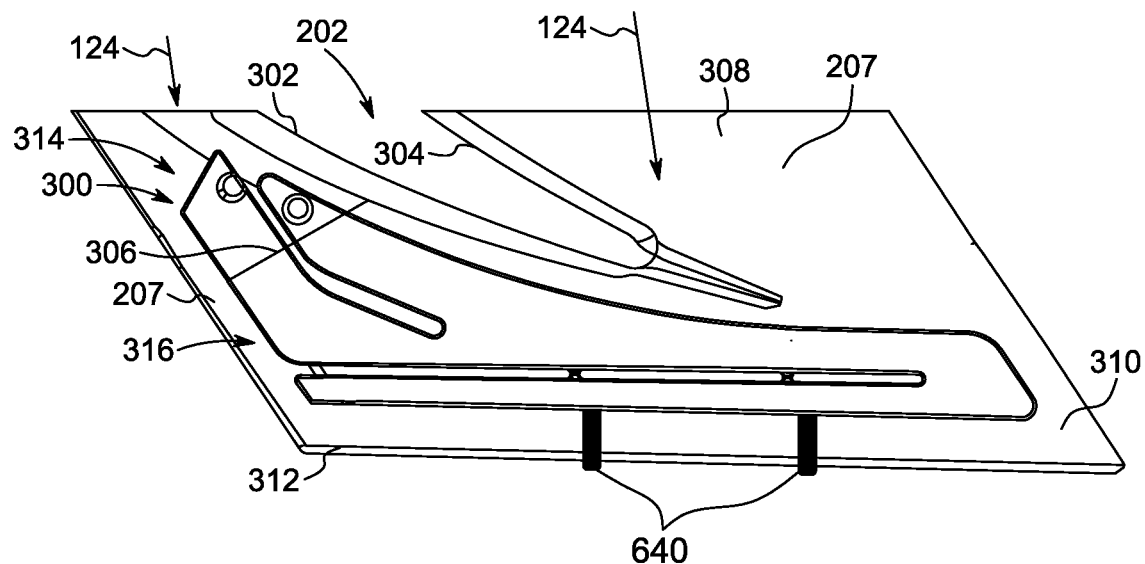
FIG. 5 is a radial top sectional view of the outer endwall shown in FIG. 4.
Figure 6:
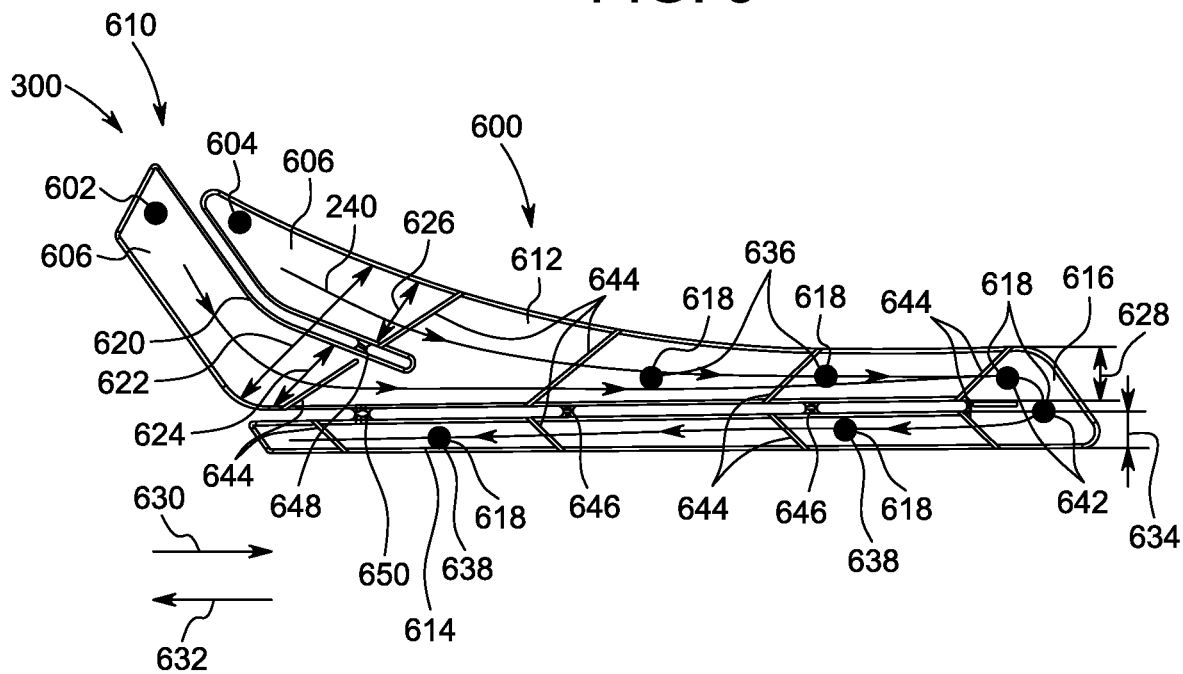
FIG. 6 is a radial top view of the exemplary core shown in FIGS. 3-5.

FIG. 3 is a perspective view of stationary airfoil 202, outer endwall 207, and inner endwall 209 and illustrates exemplary cores 300 extending through transparent outer endwall 207 and inner endwall 209. FIG. 4 is a perspective top view of stationary airfoil 202, outer endwall 207, and inner endwall 209. FIG. 5 is a radial top sectional view of an exemplary outer endwall 207. FIG. 6 is a radial top view of an exemplary core 300. As shown in FIGS. 3-5, core 300 is defined in plenum 236 of outer endwall 207 and inner endwall 209 for cooling outer endwall 207 and inner endwall 209. More specifically, cores 300 are disposed within outer endwall 207 and inner endwall 209 to facilitate cooling outer endwall 207 and inner endwall 209 with cooling fluid 240.

As shown in FIGS. 3-5, stationary airfoils 202 each include a suction side wall 302 and a pressure side wall 304 (shown in FIG. 5). Adjacent stationary airfoils 202, outer endwall 207, and inner endwall 209 define a throat 306 (shown in FIG. 5) where a velocity of combustion gases 124 is maximized. Outer endwall 207 includes an upstream portion 308 that is upstream from stationary airfoils 202 and a downstream portion 310 that is downstream from stationary airfoils 202. Outer endwall 207 also includes a trailing edge 312 adjacent to rotating airfoils 204. In the illustrated embodiment, core 300 is defined within outer endwall 207 downstream from suction side wall 302. However, core 300 may be positioned within outer endwall 207 such that an upstream portion 314 (shown in FIG. 5) of core 300 is upstream from throat 306 and a downstream portion 316 of core 300 is downstream from throat 306. Moreover, core 300 may be positioned within outer endwall 207 such that core 300 facilitates cooling outer endwall 207 and trailing edge 312.

As shown in FIG. 6, core 300 includes at least one passage 600. In the exemplary embodiment of FIG. 6, passage 600 is a serpentine passage that channels cooling fluid 240 adjacent to outer endwall 207 and inner endwall 209 to facilitate cooling outer endwall 207 and inner endwall 209. As shown in FIGS. 3 and 4, a similar serpentine passage 600 may be used to channel cooling fluid 240 adjacent to inner endwall 209 to facilitate cooling inner endwall 209. As used herein, a "serpentine passage" is a conduit with at least one turn such that the passage winds or twists. That is, the serpentine passage does not have only a substantially straight path from the inlet to the outlet. Rather, the path from the inlet to the outlet makes at least one turn such that the serpentine passage does not have a straight line-of-sight path defined from the inlet to the outlet. In the exemplary embodiment, serpentine passage 600 includes at least one inlet 602 and 604, an first inlet portion 606 and a second inlet portion 608 forming a split pass inlet region 610, a first pass 612, a second pass 614, at least one turn 616 disposed between first pass 612 and second pass 614, and at least one outlet 618. First pass 612, second pass 614, and turn 616 are oriented such that passage 600 is a serpentine passage. In the illustrated embodiment, serpentine passage 600 includes a plurality of inlets 602 and 604.

Inlets 602 and 604 receive cooling fluid 240 from coolant supply channel 233 (FIG. 2) and channel cooling fluid 240 to first inlet portion 606 and second inlet portion 608. Specifically, at least one first inlet 602 channels cooling fluid 240 to first inlet portion 606, and at least one second inlet 604 channels cooling fluid 240 to second inlet portion 608. FIG. 6 shows a single inlet 602 and 604 extending into each inlet portion 606 and 608. However, each inlet portion 606 and 608 may include a plurality of inlets 602 and 604. Additionally, serpentine passage 600 may include more than two inlet portions 606 and 608. For example, first inlets 602 may include two to twenty first inlets 602 channeling cooling fluid 240 to first inlet portion 606, and second inlets 604 may include two to twenty second inlets 604 channeling cooling fluid 240 to second inlet portion 608. More specifically, first inlets 602 may include eight to ten first inlets 602 channeling cooling fluid 240 to first inlet portion 606, and second inlets 604 may include eight to ten second inlets 604 channeling cooling fluid 240 to second inlet portion 608.

A divider 620 separates first inlet portion 606 from second inlet portion 608 to form split pass inlet region 610. Divider 620 reduces a width 622 of split pass inlet region 610 such that a velocity of cooling fluid 240 through split pass inlet region 610 is increased. More specifically, the velocity of cooling fluid 240 through split pass inlet region 610 without divider 620 would decrease because width 622 of split pass inlet region 610 increases downstream from inlets 602 and 604. Divider 620 decreases width 622 such that the velocity of cooling fluid 240 either remains constant or increases as cooling fluid 240 is channeled through split pass inlet region 610.

Additionally, first inlet portion 606 defines a first width 624, and second inlet portion 608 defines a second width 626. First width 624 may be the same or different than second width 626, and first width 624 and second width 626 may be selectively sized to enable a specific volume of cooling fluid 240 to be channeled through passage 600. More specifically, first width 624 and second width 626 may be sized for a specific volumetric flow of cooling fluid 240 such that a heat transfer coefficient of cooling fluid 240 is tuned to the specific heat transfer requirements of outer endwall 207 and/or inner endwall 209.

First inlet portion 606 and second inlet portion 608 merge into first pass 612, and each inlet portion channels cooling fluid 240 into first pass 612. First pass 612 extends through outer endwall 207 substantially parallel to trailing edge 312 and second pass 614. First pass 612 defines a third width 628 which, along with first width 624 and second width 626, may be selectively sized to enable a specific volumetric flow of cooling fluid 240 to flow therethrough such that a heat transfer coefficient of cooling fluid 240 is tuned to the specific heat transfer requirements of outer endwall 207 and/or inner endwall 209. First pass 612 receives cooling fluid 240 from first inlet portion 606 and second inlet portion 608 and channels cooling fluid 240 to turn 616.

Turn 616 receives cooling fluid 240 from first pass 612 and channels cooling fluid 240 to second pass 614. First pass 612, second pass 614, and turn 616 are oriented such that first pass 612 channels cooling fluid 240 in a first direction 630, and second pass 614 channels cooling fluid 240 in a second direction 632 opposite first direction 630. Turn 616 changes a direction of flow of cooling fluid 240 from first direction 630 to second direction 632. In the exemplary embodiment, turn 616 is a 180° turn such that first direction 630 is diametrically opposite second direction 632. In alternative embodiments, first pass 612, second pass 614, and turn 616 may be oriented such that first pass 612 and second pass 614 have any orientation that enables core 300 to operate as described herein. Turn 616 receives cooling fluid 240 from first pass 612, changes the direction of flow of cooling fluid 240, and channels cooling fluid 240 to second pass 614.

Second pass 614 extends through outer endwall 207 substantially parallel to trailing edge 312 and to first pass 612. Second pass 614 defines a fourth width 634 which, along with first width 624, second width 626, and third width 628, may be selectively sized to enable a specific volumetric flow of cooling fluid 240 such that a heat transfer coefficient of cooling fluid 240 is tuned to the specific heat transfer requirements of outer endwall 207 and/or inner endwall 209. Second pass 614 receives cooling fluid 240 from turn 616 and channels cooling fluid 240 to outlets 618.

In the exemplary embodiment, core 300 includes a single first pass 612, a single second pass 614, and a single turn 616. In alternative embodiments, core 300 may include any number of passes and/or turns that enables core 300 to operate as described herein. For example, in an alternative embodiment, core 300 may include three passes and two turns. In yet another alternative embodiment, core 300 may include four passes and three turns.

Core 300 includes at least one outlet 618 downstream from throat 306. While core 300 may include only a single outlet 618, in the exemplary embodiment, core 300 includes a plurality of outlets 618 that channel cooling fluid from core 300 into hot gas flow path 232. For example, core 300 may include at least one first outlet 636 that extends from first pass 612 through outer endwall 207 and into hot gas flow path 232. In the exemplary embodiment, core 300 includes a plurality of first outlets 636, each of which extends from first pass 612 through outer endwall 207 and into hot gas flow path 232. Cooling fluid 240 discharged into hot gas flow path 232 from first outlets 636 may form a cooling film (not shown) on outer endwall 207 that protects outer endwall 207.

Core 300 may also include at least one second outlet 638 that extends from second pass 614 through outer endwall 207 and into hot gas flow path 232. In the exemplary embodiment, core 300 includes a plurality of second outlets 638, each of which extends from second pass 614 through outer endwall 207 and into hot gas flow path 232. Cooling fluid 240 discharged into hot gas flow path 232 from second outlets 638 may form a cooling film (not shown) on outer endwall 207 that facilitates protecting outer endwall 207.

Core 300 may further include at least one third outlet 640 (shown in FIG. 4) that extends from second pass 614 through trailing edge 312 of inner endwall 209 and into hot gas flow path 232. In the exemplary embodiment, core 300 includes a plurality of third outlets 640, each of which extends from second pass 614 through trailing edge 312 of outer endwall 207 and into hot gas flow path 232. Cooling fluid 240 discharged into hot gas flow path 232 from third outlets 640 may form a cooling film (not shown) on trailing edge 312 of outer endwall 207 that protects trailing edge 312 of outer endwall 207.

Core 300 may also include at least one fourth outlet 642 that extends from turn 616 through outer endwall 207 and into hot gas flow path 232. In the exemplary embodiment, core 300 includes a plurality of fourth outlets 642, each of which extends from turn 616 through trailing edge 312 of outer endwall 207 and into hot gas flow path 232. Cooling fluid 240 discharged into hot gas flow path 232 from fourth outlets 642 may form a cooling film (not shown) on outer endwall 207 that facilitates protecting outer endwall 207. Core 300 may include outlets 218 in any location that enables core 300 to operate as described herein.

The size, shape, and relative position of first, second, third, and fourth outlets 636, 638, 640, and 642 may be sized and arranged to facilitate tuning to a specific/desired pressure drop, volumetric flow rate, and/or heat transfer coefficient of cooling fluid 240. For example, first outlets 636 may have a first size, and second outlets 638 may be sized with a second size that is smaller than the first size of first outlets 636. As such, first outlets 636 form a cooling film (not shown) on outer endwall 207, and second outlets 638 supplement the cooling film with additional cooling fluid 240. Additionally, more outlets 636, 638, 640, and 642 facilitate reducing the volumetric flow of cooling fluid 240 through passage 600 and facilitate reducing the pressure drop of cooling fluid 240 through passage 600. Accordingly, the size, shape, and position of first, second, third, and fourth outlets 636, 638, 640, and 642 may be sized and arranged to facilitate tuning the pressure drop, the volumetric flow rate, and/or the heat transfer coefficient of cooling fluid 240.

In the exemplary embodiment, first pass 612 and second pass 614 each include a plurality of turbulators or ridges 644 that create turbulence within first pass 612 and second pass 614. Specifically, turbulators 644 create turbulent flow within cooling fluid 240 to facilitate increasing the heat transfer coefficient of cooling fluid 240 within first pass 612 and second pass 614. Increasing the heat transfer coefficient increases the overall heat transfer between cooling fluid 240 and outer endwall 207. In the exemplary embodiment, turbulators 644 have a height (not shown) that is about 10% that of third width 628 and fourth width 634. However, turbulators 644 may have any other height that enables core 300 to operate as described herein.

In the exemplary embodiment, core 300 includes a plurality of hollow core ties 646 that extend from either first inlet portion 606 to second inlet portion 608 or first pass 612 to second pass 614. Specifically, core 300 includes at least one first core tie 648 that extends from first inlet portion 606 to second inlet portion 608 and at least one second core tie 650 extending from first pass 612 to second pass 614. More specifically, in the exemplary embodiment, core 300 includes a single first core tie 648 and a plurality of second core ties 650. First and second core ties 648 and 650, which define fluid passages therein, replenish downstream portions of passage 600 with cooling fluid 240. As cooling fluid 240 is channeled through passage 600, a temperature of cooling fluid 240 increases which facilitates decreasing the heat transfer coefficient of cooling fluid 240 and decreasing the overall heat transfer between cooling fluid 240 and outer endwall 207. Core ties 646 are "short cuts" that channel cooling fluid 240 from upstream portions of passage 600 to downstream portions of passage 600 without heat transfer between cooling fluid 240 and outer endwall 207. As such, cooling fluid 240 that is channeled through core ties 646 has a lower temperature than cooling fluid 240 that was channeled through first pass 612, second pass 614, and turn 616. Accordingly, core ties 646 replenish downstream portions of passage 600 with cooling fluid 240 that has a lower temperature, which facilitates increasing the heat transfer coefficient of cooling fluid 240 and overall heat transfer between cooling fluid 240 and outer endwall 207. Core ties 646 may also be used as inspection ports to inspect core 300.

During operation, inlets 602 and 604 receive cooling fluid 240 from coolant supply channel 233 and channel cooling fluid 240 to first inlet portion 606 and second inlet portion 608. First inlet portion 606 channels a portion of cooling fluid 240 through first core tie 648 to replenish second inlet portion 608. First inlet portion 606 and second inlet portion 608 merge into first pass 612 and each channels cooling fluid 240 into first pass 612. First pass 612 channels a portion of cooling fluid 240 through second core ties 650 to replenish second pass 614 and channels another portion of cooling fluid 240 to turn 616. First pass 612 also channels a portion of cooling fluid through first outlet 636 into hot gas path 232 to form a cooling film on outer endwall 207. Turn 616 channels a portion of cooling fluid 240 through fourth outlet 642 into hot gas path 232 to form the cooling film on outer endwall 207 and channels the remaining cooling fluid 240 to second pass 614. Second pass 614 channels cooling fluid 240 through second and third outlets 638 and 640 to replenish the cooling film and to form a cooling film on trailing edge 312. Cooling fluid 240 exchanges heat with outer endwall 207 as it is channeled through passage 600. As such, cooling fluid 240 facilitates cooling outer endwall 207 from within core 300 and forms a protective cooling film that protects outer endwall 207.

The serpentine configuration of passage 600 enables cooling fluid 240 to cool a larger area of outer endwall 207, thus increasing the overall heat transfer between cooling fluid 240 and outer endwall 207. Additionally, the serpentine orientation of passage 600 enables cooling fluid 240 to have a lower pressure that is approximately equal to the pressure of combustion gases 124 at throat 306. Furthermore, widths 624, 626, 628, and 634 are sized to tune the pressure drop of cooling fluid 240 through passage 600 and to facilitate increasing the overall heat transfer between cooling fluid 240 and outer endwall 207. Moreover, outlets 618 channel cooling fluid 240 into hot gas path 232 to protect outer endwall 207 by forming a cooling film. Additionally, core ties 646 replenish downstream portions of passage 600 with cooling fluid 240. Accordingly, the arrangement of core 300 increases the overall heat transfer between cooling fluid 240 and outer endwall 207.

Although the discussion of FIGS. 3 through 6 has described core 300 and its features in connection with outer endwall 207, it should be understood that the core 300 may be employed with similar features in inner endwall 209 to achieve similar results and benefits.

Figure 7:
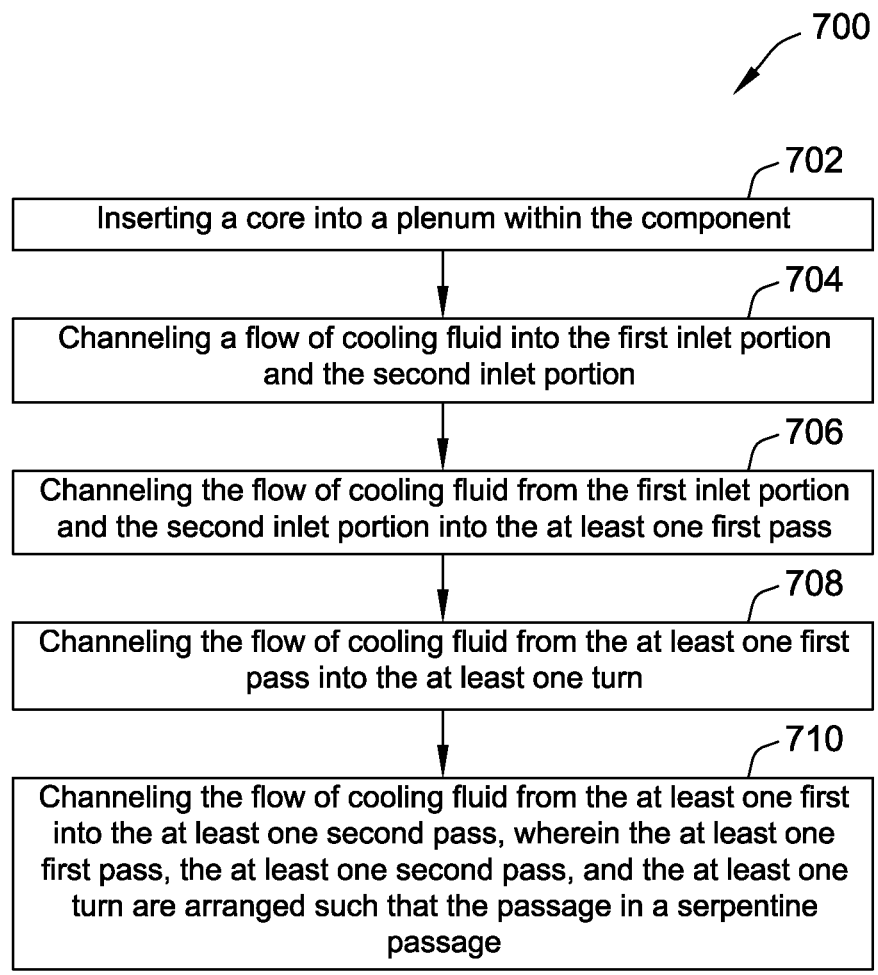
FIG. 7 is a flow diagram of an exemplary method of cooling an endwall, such as the endwall, shown in FIGS. 2-6.

FIG. 7 is a flow diagram of an exemplary method 700 of cooling a component of a rotary machine. In the exemplary embodiment, method 700 includes inserting 702 a core into a plenum within the component. The core includes a passage including an inlet portion, at least one first pass, at least one second pass, at least one turn between respective first pass(es) and second pass(es). The inlet portion includes a divider that separates a first inlet portion from a second inlet portion, such that the inlet portion is a split pass inlet. Method 700 also includes channeling 704 a flow of cooling fluid into the first inlet portion and the second inlet portion. Method 700 further includes channeling 706 the flow of cooling fluid from the first inlet portion and the second inlet portion into the at least one first pass. The flow of cooling fluid from the first inlet portion merges with the flow of cooling fluid from the second inlet portion, and the at least one first pass channels the flow of cooling fluid in a first direction. Method 700 also includes channeling 708 the flow of cooling fluid from the at least one first pass into the at least one turn. The at least one turn changes a direction of flow of the cooling fluid from the first direction to a second direction opposite the first direction. Method 700 further includes channeling 710 the flow of cooling fluid from the at least one turn into the at least one second pass. The at least one first pass, the at least one second pass, and the at least one turn are arranged such that the passage is a serpentine passage.

The above described systems relate to a serpentine core for use in cooling portions of a hot gas path in a rotary machine. Specifically, in the exemplary embodiment, a rotary component includes an outer endwall formed in a nozzle of a turbine section within the rotary machine. The outer endwall includes a core for use in cooling the outer endwall. The core includes a serpentine passage including an inlet portion, a first pass, a second pass, and a turn between the first pass and the second pass. The inlet portion includes a divider that separates a first inlet portion from a second inlet portion, such that a split pass inlet is defined. The first pass, the second pass, and the turn include a plurality of outlets, each of which channels cooling fluid from the core into the hot gas path to form a cooling film on the outer endwall. A plurality of hollow core ties channels cooling fluid from an upstream portion of the core to a downstream portion of the core to enable the downstream portions to be replenished with lower temperature cooling fluid.

In the exemplary embodiment, cooling fluid is channeled through the first pass, the second pass, and the turn to facilitate convective cooling of the outer endwall from within the core. The serpentine configuration of the first pass, the second pass, and the turn enables the cooling fluid to convectively cool a larger area of the outer endwall, thus increasing the overall heat transfer between the cooling fluid and the outer endwall. Additionally, the serpentine configuration enables the cooling fluid to circulate with a lower pressure that is substantially equal to the pressure of combustion gases at a throat of the nozzle. Furthermore, a width of each of the first pass, the second pass, and the turn is selected to facilitate modification of, or tune, the pressure drop of the cooling fluid through the first pass, the second pass, and the turn and to increase the overall heat transfer between the cooling fluid and the outer endwall. Moreover, the outlets channel cooling fluid into the hot gas path to facilitate forming a cooling film across the stator endwall. Additionally, the core ties replenish downstream portions of the core with cooling fluid. Thus, the core accomplishes both convective cooling of the endwall and film cooling of the endwall.

Additionally, an exemplary technical effect of the systems and methods described herein includes at least one of: (a) removing heat from a rotary machine component; (b) increasing the heat transfer coefficient of a cooling fluid; (c) increasing the overall heat transfer between the cooling fluid and the rotary machine component; and (d) increasing rotary machine efficiency.

Exemplary embodiments of systems and methods for cooling portions of a hot gas path of a rotary machine are described above in detail. The methods and systems are not limited to the specific embodiments described herein, but rather, components of systems and/or steps of the methods may be utilized independently and separately from other components and/or steps described herein. For example, the method may also be used in combination with other turbine components, and are not limited to practice only with the portions of the hot gas path of the rotary machine as described herein. Rather, the exemplary embodiment can be implemented and utilized in connection with many other rotary machine applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A core for use in cooling a component used in a rotary machine, said core comprising:
a passage comprising:
a first inlet portion;
a second inlet portion;
a divider separating said first inlet portion from said second inlet portion such that said first inlet portion, said second inlet portion, and said divider define a split pass inlet;
at least one first pass for channeling a flow of cooling fluid in a first direction from the split pass inlet;
at least one second pass for channeling the flow of cooling fluid in a second direction substantially opposite the first direction;
at least one turn for changing a direction of flow of the cooling fluid from the first direction to the second direction, wherein said at least one first pass, said at least one second pass, and said at least one turn are arranged such that said passage defines a serpentine passage; and
an outlet extending from said at least one first pass to an exterior surface of said core and oriented to channel a flow of cooling fluid from said at least one first pass, through said outlet, to the exterior surface of said core to form a protective film on the exterior surface of said core.

2. The core of claim 1, wherein said passage comprises at least one first inlet for channeling the flow of cooling fluid into said first inlet portion and at least one second inlet for channeling the flow of cooling fluid into said second inlet portion.

3. The core of claim 1, wherein said at least one first pass and said at least one second pass each comprise a plurality of turbulators for generating turbulence within the flow of cooling fluid.

4. The core of claim 1, wherein said passage further comprises a plurality of core ties for channeling a portion of the flow of cooling fluid from an upstream portion of said passage to a downstream portion of said passage.

5. The core of claim 4, wherein said plurality of core ties comprises at least one first core tie for channeling a portion of the flow of cooling fluid from said first inlet portion to said second inlet portion.

6. The core of claim 4, wherein said plurality of core ties comprises at least one second core tie for channeling a portion of the flow of cooling fluid from said at least one first pass to said at least one second pass.

7. A gas turbine system comprising:
a turbine section coupled in flow communication with a combustion system, wherein said turbine section comprises:
an inner endwall circumscribing the longitudinal axis of the gas turbine system;
an outer endwall circumscribing a longitudinal axis of the gas turbine system and said inner endwall;
a plurality of airfoils extending between said outer endwall and said inner endwall; and
a core positioned within at least one of said outer endwall and said inner endwall for cooling at least one of said outer endwall and said inner endwall, said core comprising:
a passage comprising:
a first inlet portion;
a second inlet portion;
a divider separating said first inlet portion from said second inlet portion such that said first inlet portion, said second inlet portion, and said divider define a split pass inlet;
at least one first pass for channeling a flow of cooling fluid in a first direction from the split pass inlet;

at least one second pass for channeling a flow of cooling fluid in a second direction substantially opposite the first direction; and at least one turn for changing a direction of flow of the cooling fluid from the first direction to the second direction, wherein said at least one first pass, said at least one second pass, and said at least one turn are arranged such that said passage defines a serpentine passage, wherein said passage further comprises a plurality of outlets extending through said outer endwall, wherein said plurality of outlets comprises at least one first outlet extending from said at least one first pass through said outer endwall, and wherein a portion of the flow of cooling fluid is channeled through said at least one first outlet to form a protective film on said outer endwall.

8. The gas turbine system of claim 7, said passage comprises a first inlet for channeling the flow of cooling fluid into said first inlet portion and a second inlet for channeling the flow of cooling fluid into said second inlet portion.

9. The gas turbine system of claim 7, wherein adjacent airfoils of said plurality of airfoils define a throat therebetween, and wherein said passage further comprises an upstream portion and a downstream portion, and wherein said upstream portion is positioned upstream of said throat and said downstream portion is positioned downstream of said throat.

10. The gas turbine system of claim 7, wherein said plurality of outlets comprises at least one second outlet extending from said at least one second pass through said outer endwall, and wherein a portion of the flow of cooling fluid is channeled through said at least one second outlet to form a protective film on said outer endwall.

11. The gas turbine system of claim 7, wherein said outer endwall comprises a trailing edge and said plurality of outlets comprises at least one third outlet extending from said at least one second pass through said trailing edge, and wherein a portion of the flow of cooling fluid is channeled through said at least one third outlet to form a protective film on said trailing edge.

12. The gas turbine system of claim 7, wherein said plurality of outlets comprises at least one fourth outlet extending from said at least one turn through said outer endwall, and wherein a portion of the flow of cooling fluid is channeled through said at least one fourth outlet to form a protective film on said outer endwall.

13. A method of cooling a component of a rotary machine, said method comprising:

inserting a core into a plenum within the component, the core including a passage including an inlet portion, at least one first pass, at least one outlet extending from the at least one first pass to an exterior surface of the core, at least one second pass, at least one turn, the inlet portion including a first inlet portion, a second inlet portion, and a divider, wherein the divider separates the first inlet portion from the second inlet portion such that the inlet portion is a split pass inlet;

channeling a flow of cooling fluid into the first inlet portion and the second inlet portion;

channeling the flow of cooling fluid from the first inlet portion and the second inlet portion into the at least one first pass, wherein the flow of cooling fluid from the first inlet portion merges with the flow of cooling fluid from the second inlet portion, and wherein the at least one first pass channels the flow of cooling fluid in a first direction;

channeling a first portion of the flow of cooling fluid from the at least one first pass through the outlet and to the exterior surface of the core to form a protective film on the exterior surface of the core;

channeling a second portion of the flow of cooling fluid from the at least one first pass into the at least one turn, wherein the at least one turn changes a direction of flow of the cooling fluid from the first direction to a second direction opposite the first direction; and channeling the second portion of the flow of cooling fluid from the at least one turn into the at least one second pass, wherein the at least one first pass, the at least one second pass, and the at least one turn are arranged such that the passage defines a serpentine passage.

14. The method of claim 13, further comprising channeling the flow of cooling fluid into a first inlet and a second inlet.

15. The method of claim 13, further comprising channeling the flow of cooling fluid from the first inlet portion to the second inlet portion through at least one first core tie.

16. The method of claim 13, further comprising channeling the flow of cooling fluid from the at least one first pass to the at least one second pass through at least one second core tie.

17. The method of claim 13, further comprising generating turbulence within the flow of cooling fluid using a plurality of turbulators.

18. The method of claim 13, further comprising replenishing the flow of cooling fluid in the at least one second pass by bypassing at least one turn by channeling the flow of cooling fluid from the first inlet portion to the second inlet portion through at least one first core tie.

* * * * *